United States Patent
Tamayama et al.

(10) Patent No.: US 6,924,741 B2
(45) Date of Patent: Aug. 2, 2005

(54) METHOD AND SYSTEM FOR DISPLAYING GUIDANCE INFORMATION

(75) Inventors: Shotaro Tamayama, Ichikawa (JP); Atsushi Sato, Fuchu (JP); Keiko Ishibashi, Tokyo (JP); Seiji Terasawa, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 4 days.

(21) Appl. No.: 10/368,410

(22) Filed: Feb. 20, 2003

(65) Prior Publication Data

US 2004/0051644 A1 Mar. 18, 2004

(30) Foreign Application Priority Data

Sep. 18, 2002 (JP) ........................................ 2002-271740

(51) Int. Cl.[7] .............................................. G08B 13/14
(52) U.S. Cl. ................................ 340/572.1; 340/573.4; 340/925; 701/211
(58) Field of Search .......................... 340/286.05, 572.1, 340/815.4, 944, 925, 573.4; 705/28; 701/211

(56) References Cited

U.S. PATENT DOCUMENTS 5,793,882 A * 8/1998 Piatek et al. ................ 382/115
6,617,970 B2 * 9/2003 Makiyama et al. ........ 340/573.1
6,622,088 B2 * 9/2003 Hood ........................... 701/211
2003/0210148 A1 * 11/2003 Imasaki et al. ............ 340/573.1

FOREIGN PATENT DOCUMENTS

JP     2002-031538 A     1/2002

* cited by examiner

*Primary Examiner*—Jeffery Hofsass
*Assistant Examiner*—Jennifer Stone
(74) *Attorney, Agent, or Firm*—Antonelli, Terry, Stout & Kraus, LLP

(57) ABSTRACT

In an airport terminal 1, an identification tag 5 for transmitting inherent identification tag information and its position information is handed to a customer 6. The information is received by a tag recognition apparatus 2 and transferred to a recognition PC 8 which analyzes the received information and transmits the analysis result to an image data server 9. The server 9 reads out image data for a guidance convenient to the customer 6. An image creation PC 10 generates a guidance image signal base on the image data and transmits it to an image projector 3 closest to the customer 6 thereby to display a guidance image 4 on a floor surface 1a near the customer 6. If the customer 6 has enough time, the guidance information of available facilities is displayed as a part of the guidance image 4.

10 Claims, 7 Drawing Sheets

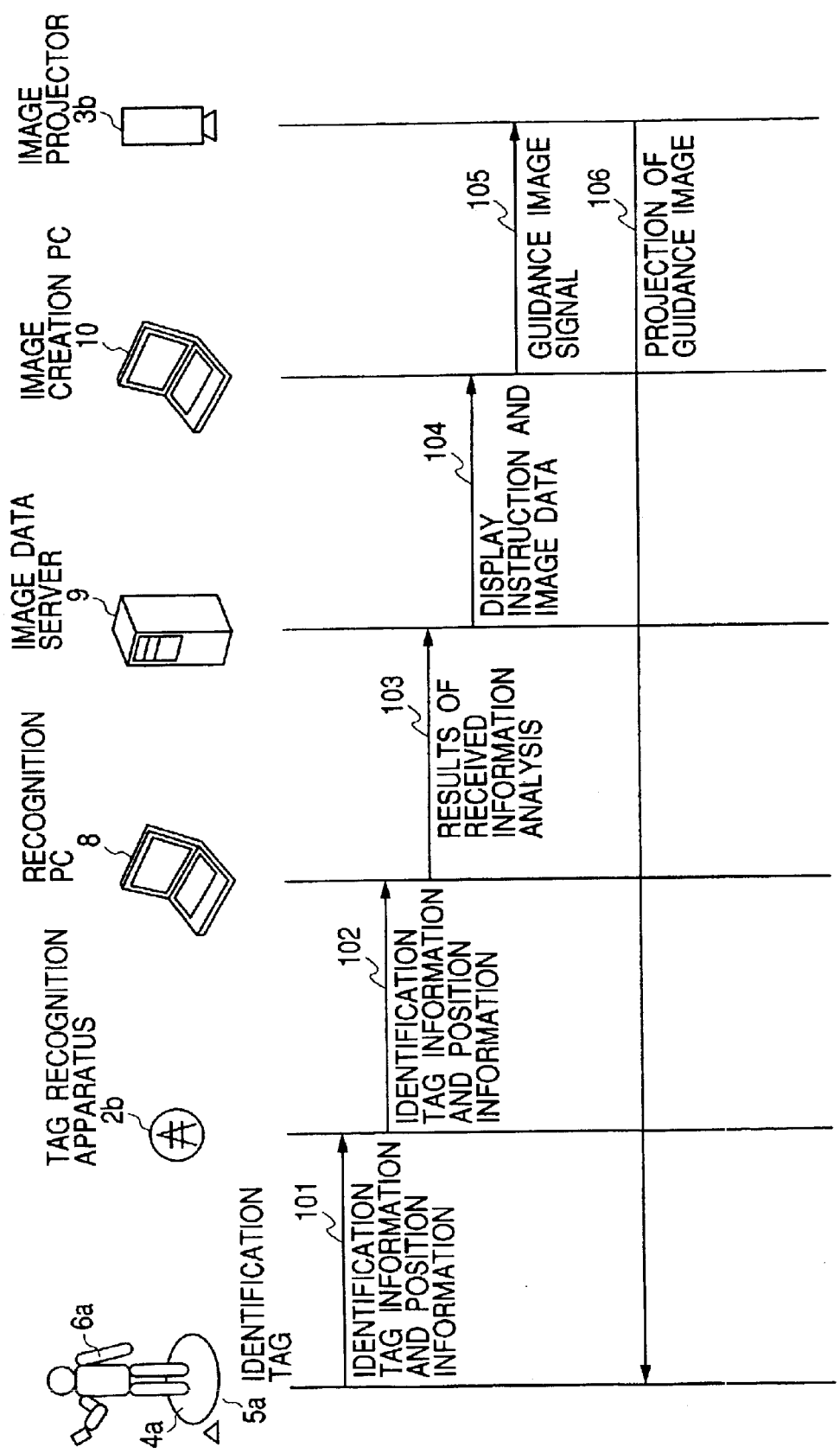

METHOD AND SYSTEM FOR DISPLAYING GUIDANCE INFORMATION

BACKGROUND OF THE INVENTION (1) Field of the Invention

The present invention relates to a method and a system for displaying guidance information for showing the way in large-scale facilities such as airport terminals, large stations, medical institutions, amusement parks and expositions.

(2) Description of the Related Art

In the above large-scale facilities, display panels for guiding customers using those are provided. On the display panel, to show the position and direction of a required place, an arrow showing the name and direction of the place is indicated.

For example, in an airport, when a customer receives a boarding pass at a check counter, he/she checks a boarding plane by this boarding pass. Based on this, after checking the departure time and the boarding gate of the plane from a display panel, he/she finds the position of the gate from a display panel provided in the airport. In a large station, when a customer checks the arrival platform of a train to be taken on a timetable display panel, he/she recognizes the direction of the platform at which he/she is to take the train based on a display panel showing the directions of the platforms, going to the platform according to the instruction to reach there.

As shown in Japanese Patent Application Laid-Open No. 2002-31538, in a prior art in which route guidance is displayed on a portable terminal carried by a user, the user himself/herself must input his/her destination. Not everybody can obtain information easily.

SUMMARY OF THE INVENTION

When the direction of a place a customer desires to go to is shown on a display panel, the display panel is not always provided in a place the customer can find easily. In a crowded place, the customer may not find it easily. When the customer finds the display panel to proceed according to the instruction, it takes time to find the next display panel spaced a long distance away therefrom. The customer feels uneasy about whether this direction is really right. The customer may not reach the desired place smoothly.

Some display panels may not display information needed by the customer. To obtain necessary information, it may take very long time to find another display panel on which it is displayed.

To solve such problems, an object of the present invention is to provide a method and a system for displaying guidance information which can display information needed by a customer in a large-scale facility so that the customer can easily look at it.

In order to achieve the above object, a method for displaying guidance information according to the present invention, comprises the steps of: recognizing position information of an identification tag and identification tag information stored in the identification tag; obtaining related information of the recognized position information and the identification tag information from a server via a communication line; creating an image based on the obtained related information; and displaying the created image near the identification tag.

In order to achieve the above object, a system for displaying guidance information according to the present invention, comprises: means for recognizing position information of an identification tag and identification tag information stored in the identification tag; means for creating related information of the recognized position information and the identification tag information; means for obtaining the related information from a server via a communication line to create an image according to the obtained related information; and means for displaying the created image near the identification tag.

The means for creating an image is an image creation unit having an image database and creates the image using the image database. The image is a guidance image and is displayed by projecting it onto a floor surface near the identification tag. The image is displayed near the identification tag when the identification tag is at a predetermined position.

The related information includes time information, and the means for creating an image creates an image corresponding to the recognized position information, the identification tag information and the time information.

BRIEF DESCRIPTION OF THE DRAWINGS

FIG. 2 is a flowchart showing a specific example of the operation of the embodiment shown in FIG. 1;

DETAILED DESCRIPTION OF PREFERRED EMBODIMENTS

Figure 1:
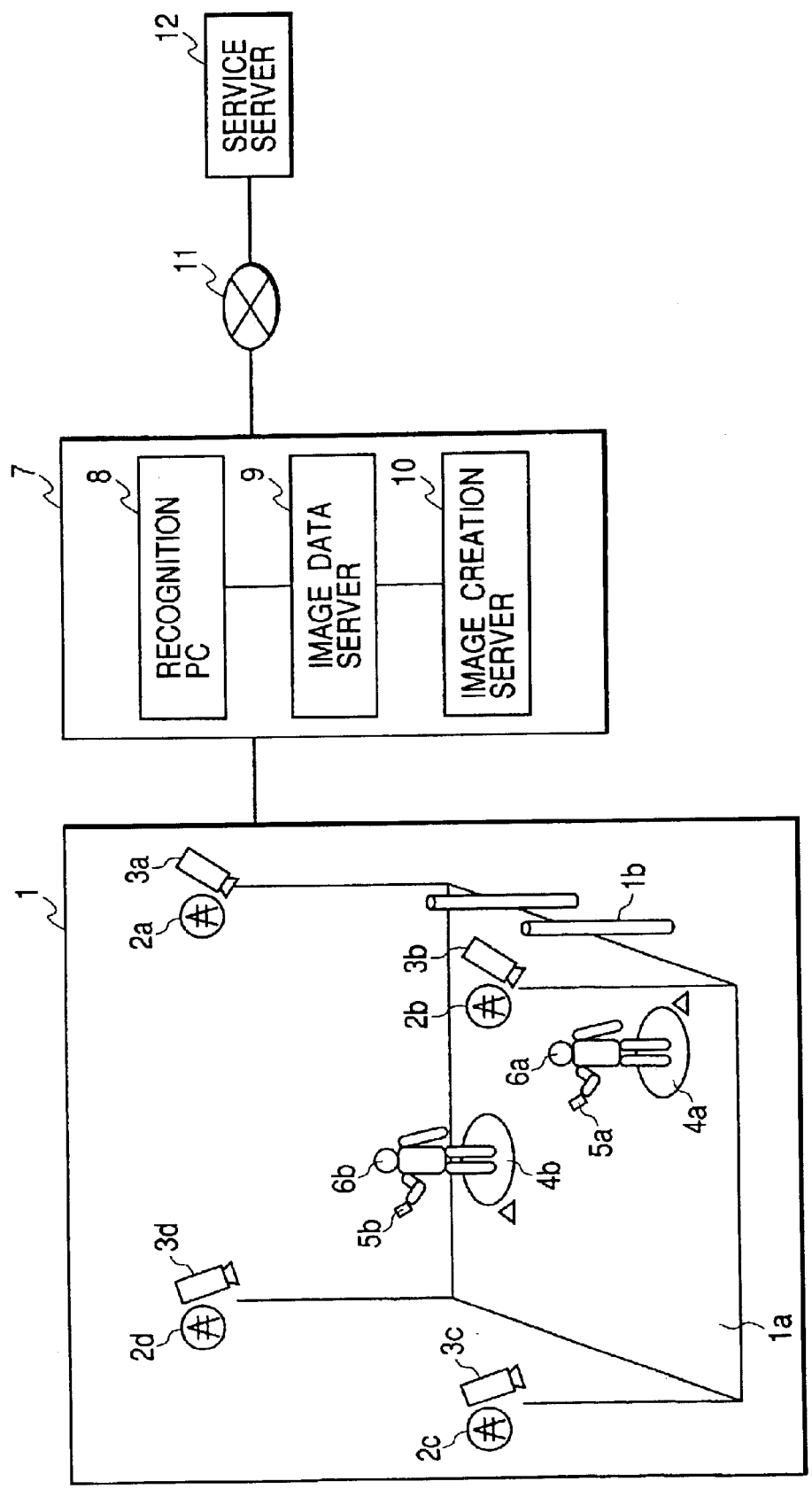
FIG. 1 is a diagram schematically showing an embodiment of a system and a method for displaying guidance information according to the present invention.

An embodiment of the present invention will be described below by referring to the drawings.

FIG. 1 schematically shows an embodiment of a system and a method for displaying guidance information according to the present invention.

The numeral 1 denotes an airport terminal; the numeral 1a, a floor surface; and the numeral 1b, a gate. The numerals 2a to 2d denote a tag recognition apparatus; the numerals 3a to 3d, an image projector; the numerals 4a, 4b, a projected image; the numerals 5a, 5b, an identification tag; and the numerals 6a, 6b, a customer (in this case, a passenger). The numeral 7 denotes a facility server comprising a recognition PC (computer) 8, an image data server 9 and an image creation PC 10. The numeral 11 denotes a communication network; and the numeral 12, a service server.

The system and the method for displaying guidance information will be described here by taking an airport as an example. This is the same for other large-scale facilities such as stations, medical institutions, amusement parks and expositions.

In FIG. 1, the customers 6a, 6b who have received a boarding pass at a check counter (not shown) in the airport terminal 1 are handed the identification tags 5a, 5b, and carry them until they gets on a plane. Each of the identification tags 5a, 5b is provided with means for creating inherent identification tag information, means for detecting its own position, and means for communicating with the tag recognition apparatuses 2a to 2d provided in the places of the terminal 1. The image projectors 3a to 3d as well as the tag recognition apparatuses 2a to 2d are located in the places of the terminal 1.

When the customer goes through boarding procedures at the check counter, the customer is handed a boarding pass and checks information related on a plane such as the number, departure time and gate number of the plane described on the boarding pass. The above information has already been registered in the database of a plane company with customer information such as a customer name. At this time, the customer is handed an identification tag, and then, the person in charge inputs, to a terminal, the registration number allocated to the identification tag with the customer information. This associates the customer information of the customer and the information on the boarding plane stored in the database of the plane company with the registration number of the identification tag handed to the customer. This associated information is then sent to the recognition PC 8 of the facility server 7, thereby to register it in the database so as to be referred by the recognition PC 8.

The registration number of the identification tag and the identification tag information of the identification tag correspond with each other on a one-on-one basis. The recognition PC 8 recognizes the identification tag information corresponding to the registration number to uniquely correspond it with the registered customer information and the information on the boarding plane.

Thus, the recognition PC 8 registers the identification tag information of the identification tag 5a carried by the customer 6a in association with the customer information of the customer 6a and the information on the boarding plane. For the customer, the identification tag information of the identification tag 5b carried by the customer 6b is also registered in association with the customer information of the customer 6b and the information on the boarding plane.

The tag recognition apparatuses 2a to 2d transmit calling signals of the same phase including the inherent numbers in a predetermined short period. The identification tags 5a and 5b receive the calling signals transmitted from a plurality of tag recognition apparatuses 2a to 2d. From the inherent numbers of the tag recognition apparatuses 2a to 2d and the phase relation of the receiving signals, the identification tags 5a and 5b can detect their own positions relative to the tag recognition apparatuses 2a to 2d by their incorporated position detection means. In this case, since the positions of the tag recognition apparatuses 2a to 2d in the terminal 1 are known, the identification tags 5a and 5b can obtain the position information indicating their own positions by detecting the positions of the recognition apparatuses in the terminal 1. The position information of the identification tags may be obtained using other means such as a GPS (Global Positioning System).

When the position information is obtained, the identification tags 5a, 5b add their own identification tag information to the position information and transmit it, as the tag information, to the tag recognition apparatuses 2a to 2d. When the tag recognition apparatuses 2a to 2d receive the tag information from the identification tags 5a and 5b, they transfer the received information to the facility server 7. By the operation of the facility server 7, ones of the image projectors 3a to 3d near the identification tags 5a and 5b, that is, closest to the customers 6a and 6b display the guidance images 4a and 4b needed by the customers 6a and 6b on the floor surface near the customers 6a and 6b, respectively.

The operation of this point will be described below with reference to FIG. 2 by taking the customer 6a as an example. In FIG. 2, parts corresponding to FIG. 1 are indicated by the same numerals.

In FIGS. 1 and 2, the tag information (identification tag information and position information) transmitted from the identification tag 5a is received by the tag recognition apparatuses 2a to 2d (step 101). The tag recognition apparatuses 2a to 2d transmit the received tag information to the facility server 7 (step 102). In the facility server 7, the recognition PC 8 selectively fetches the tag information from one of the tag recognition apparatuses 2a to 2d, for example, the tag information received by the tag recognition apparatus 2b closest to the customer 6a, according to the reception order and the received signal level, for example, and analyzes the identification tag information and the position information to decide the image projector 3b closest to the identification tag 5a.

The recognition PC 8 reads out the private information of the customer 6a and information on the boarding plane, for example, departure time and gate number corresponding to the identification tag information from the registered information in the database, detects the direction of a gate having the gate number viewed from the identification tag 5a, based on the read out information, and judges whether there is enough time for the departure time (step 103). When detecting the direction of the gate, the facility server 7 can search the route from the current position of the identification tag to the gate based on the position information of the identification tag and map data stored in the server.

The recognition PC 8 transmits the above analysis result to the image data server 9. When it judges that the customer 6a has enough time for the departure time, the position information of the identification tag 5a is transmitted to the service server 12 via the communication network 11. The service server 12 holds service information on facilities available to the customer during the enough time, such as a shopping center, lounge, restaurant, toilet in the terminal 1. The service server 12 selects the service information on the serviceable facility corresponding to the position information of the identification tag 5a received from the recognition PC 8 and transmits it to the image data server 9. When the customer 6a has no enough time for the departure time, the recognition PC 8 does not request the service information to the service server 12 because the customer cannot use the service facility introduced.

The image data server 9 holds image data for providing various type of guidance to the customer. The image data server 9 selectively reads out the corresponding image data based on the analysis result received from the recognition PC 8. When the service information is received from the service server 12, the image data server 9 reads out image data corresponding to the service information. The image data are sent to the image creation PC 10 together with the instruction of the display (step 104).

The image creation PC 10 gets the image data from the image data server 9 as the image database to generate a guidance image for the customer 6a, and supplies guidance image signals to the image projector 3b designated by the recognition PC 8 to display a guidance image (step 105). The image projector 3b projects and displays the guidance image 4a on the floor surface near the customer 6a (step 106).

Figure 3A:
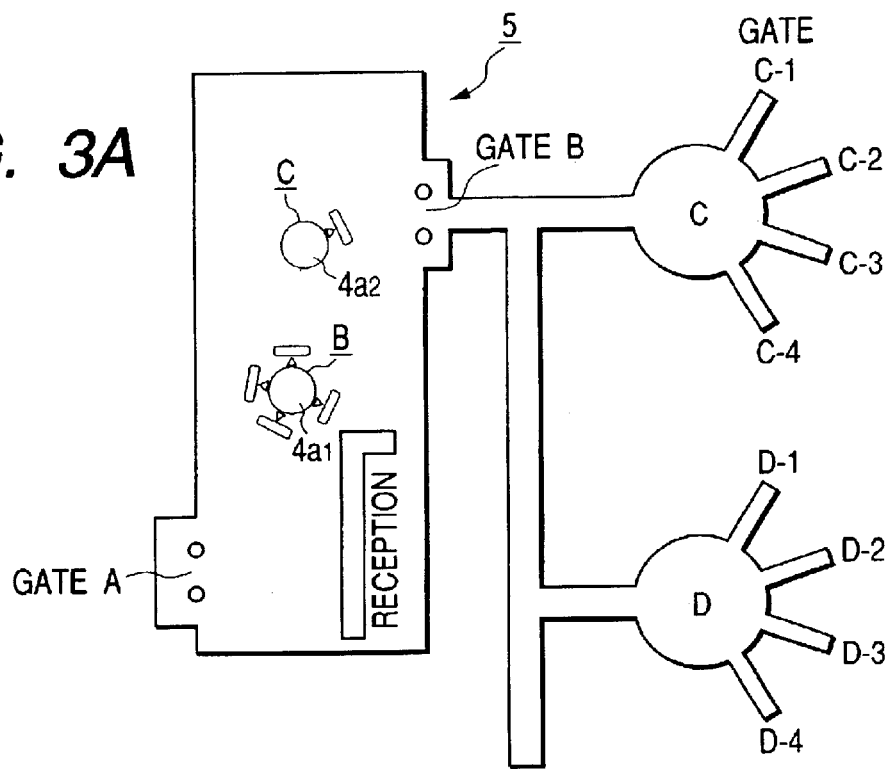
FIGS. 3A–3C are diagrams showing a specific example of a guidance screen of the embodiment shown in FIG. 1.
Figure 3B:
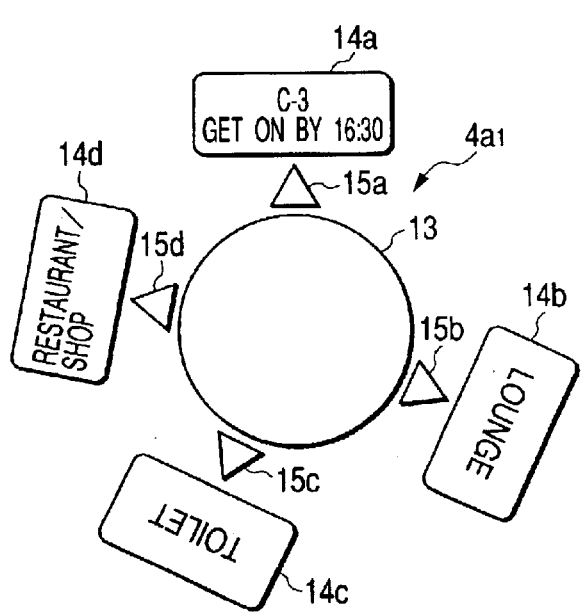
Figure 3C:
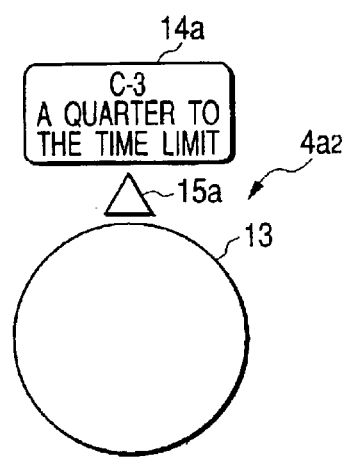

FIGS. 3A to 3C are diagrams showing specific examples of the guidance screen FIG. 3A shows the position of the identification tag 5a in the airport terminal 1. Two positions B and C are shown here. FIGS. 3B and 3C show examples of the guidance images at the positions B and C. The customer at the position B is assumed to have enough time for the departure time and the customer at the position C is assumed to have no enough time therefor.

It is assumed here that these customers are directed to get on the plane from the gate C-3. The customer who has completed the boarding procedures at the check counter (reception) carries the handed identification tag. When there is enough time for the departure time, a guidance image $4a_1$ as shown in FIG. 3B is displayed on the floor surface near the position B.

In the guidance image $4a_1$, guidance areas 14a, 14b 14c and 14d showing the names of the facilities to be guided and direction marks 15a, 15b, 15c and 15d showing the direction of the way to the facilities are arrayed around a circular large mark 13. The center of the mark 13 is the position of the customer. The direction marks 15a, 15b, 15c and 15d indicate the directions of the facilities viewed from the center of the mark 13. The guidance areas 14a, 14b, 14c and 14d are displayed in the directions of the direction marks 15a, 15b, 15c and 15d, respectively. With movement of the customer, the display position of the guidance image is moved.

The guidance area 14a indicating the guidance "C-3 Get on by 16:30" in the direction of the gate C-3 to be used by the customer, the "lounge" guidance area 14b, the "toilet" guidance area 14c and the "restaurant/shop" guidance area 14d, as the indication about the service facilities, are displayed here corresponding to the directions of the facilities, respectively. Of these, as described above, the guidance area 14a about the boarding plane is created based on the image data read out from the image data server 9 according to the analysis result of the recognition PC 8. The other guidance areas 14b to 14d are created for the customer, who has enough time, from the image information read out from the image data server 9 based on the service information from the service server 12.

To the customer who has no enough time since the departure time of the boarding plane is getting close, a guidance image $4a_2$ as shown in FIG. 3C is displayed on the floor surface near the customer position C. The guidance image $4a_2$ is comprised of the mark 13 indicating the customer position, the direction mark 15a indicating the direction of the way to the gate C-3, and a guidance area 14a indicating the guidance "A Quarter to the Time Limit" about the boarding plane displayed at the position in the direction of the direction mark 15a. The guidance areas about the service information received from the service server 12 are not created.

The guidance images $4a_1$, $4a_2$ as shown in FIGS. 3B, 3C move on the floor surface with movement of the customer so that the customer is always positioned at the center of the mark 13. With movement of the customer, the way directions of the facilities viewed from the customer are changed. The direction marks 15a to 15d and the guidance areas 14a to 14d move around the mark 13 so as to always indicate the way direction of the corresponding facility. The display movement control is carried out by always fetching the position information from the identification tag 5 by the recognition PC 8 of the facility server 7.

Figure 4A:
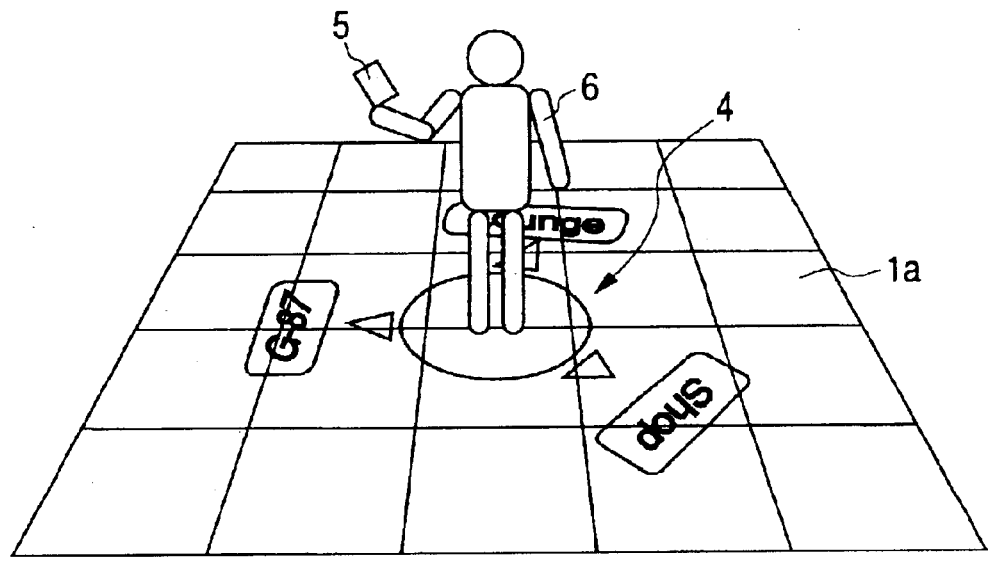
FIGS. 4A, 4B are diagrams showing a specific example of the display state of the guidance screen of the embodiment shown in FIG. 1.
Figure 4B:
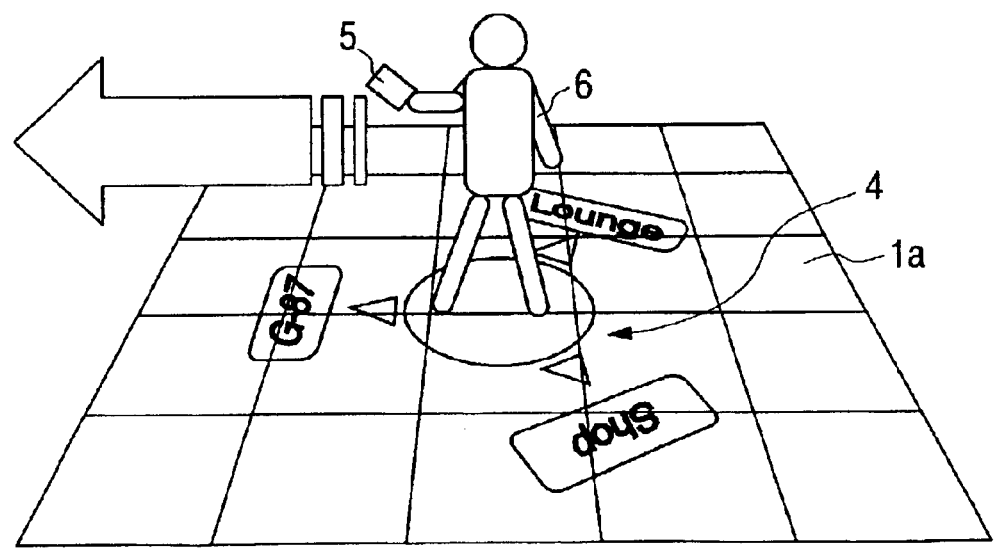

FIGS. 4A, 4B are diagrams showing a specific example of the display state of the guidance image 4. The numeral 5 denotes the identification tag; and the numeral 6, the customer.

FIG. 4A shows the display state of the guidance image 4 to one still customer 6. In this case, the image projectors 3a to 3d shown in FIG. 1 display, to the customer 6, the guidance image 4 on the floor surface 1a, as explained in FIG. 3. Each of the image projectors 3a to 3d may be a projector installed at a high place such as a ceiling in the terminal 1. Instead of the projectors, a plurality of displays comprising of, for example, LCDs (Liquid Crystal Display), PDPs (Plasma Display Panel) or LEDs (Light-Emitting Diode) may be buried into the entire floor surface 1a without any space. When the displays are buried into the floor surface 1a, they form one multi-screen so that the entire floor surface 1a forms one large display screen. In this case, the displays are covered with a transparent protection plate having a high mechanical strength.

By spreading one large screen on the entire floor surface 1a, as shown in FIG. 4B, the guidance image 4 can be moved with the customer 6 when the customer 6 moves. By changing the display of the guidance image 4 in accordance with movement of the customer 6, as explained in FIG. 3, the customer 6 can recognize the direction of his/her desired facility at any time and can walk in the direction of the desired facility immediately without getting lost.

When projectors are applied as the image projectors 3a to 3d, the projection direction of one of the projectors is controlled so as to follow the movement of the customer 6. When the customer exceeds a certain range, the next projector takes over the projection of the guidance image for the customer 6. In this case, preferably, many projectors are prepared and controlled so that two or more customers are not assigned to one projector at the same time.

Figure 5:
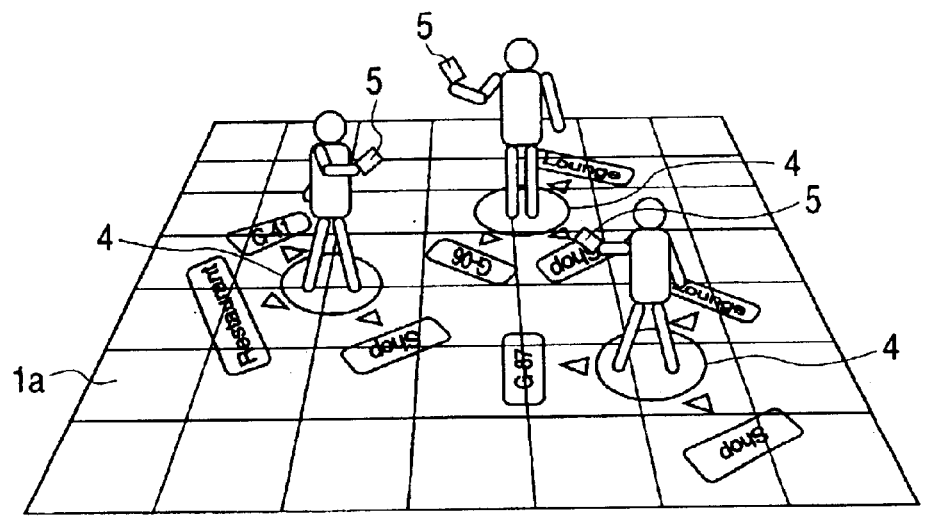
FIG. 5 is a diagram showing another specific example of the display state of the guidance screen of the embodiment shown in FIG. 1.
Figure 6:
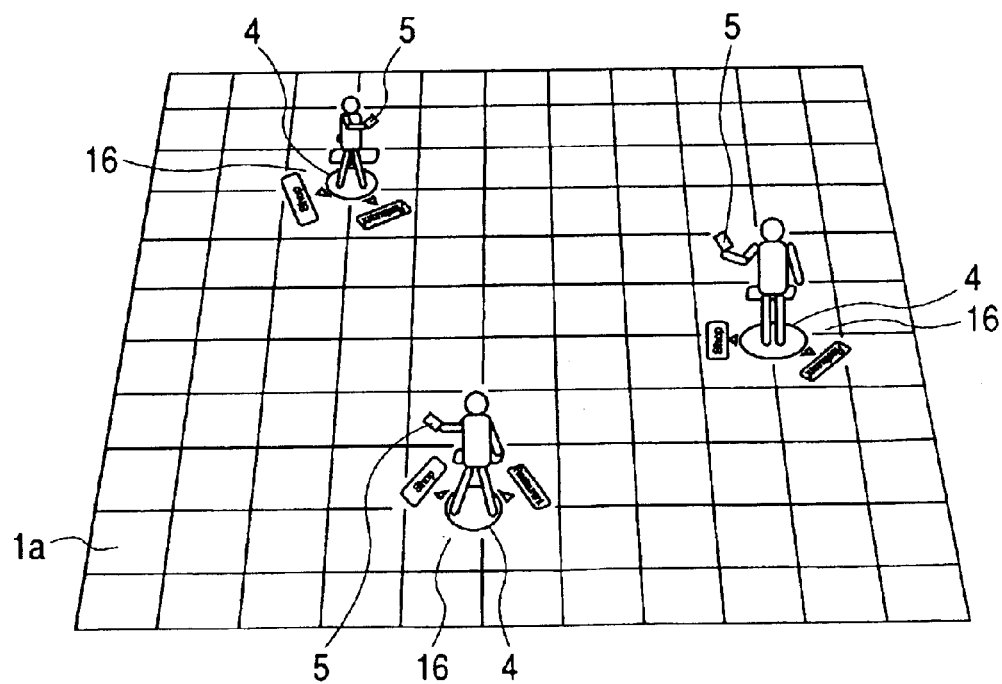
FIG. 6 is a diagram showing a further specific example of the display state of the guidance screen of the embodiment shown in FIG. 1.

FIGS. 5 and 6 are diagrams showing another specific example of the display state of the guidance image 4. Parts corresponding to FIG. 4 are indicated by the same numerals. The numerals 16a to 16c denote a displayed area of the guidance image.

In this embodiment, as shown in FIG. 5A, guidance images 4 having different service information are created for the customers so that service information about the shops and restaurants is offered to one customer and service information about the shops and lounges is offered to the other customer. Such guidance manner can be realized by letting each of the customers tell his/her desired guidance at the check counter or by switching the guidance modes according to the time waiting for the departure time.

Figure 7:
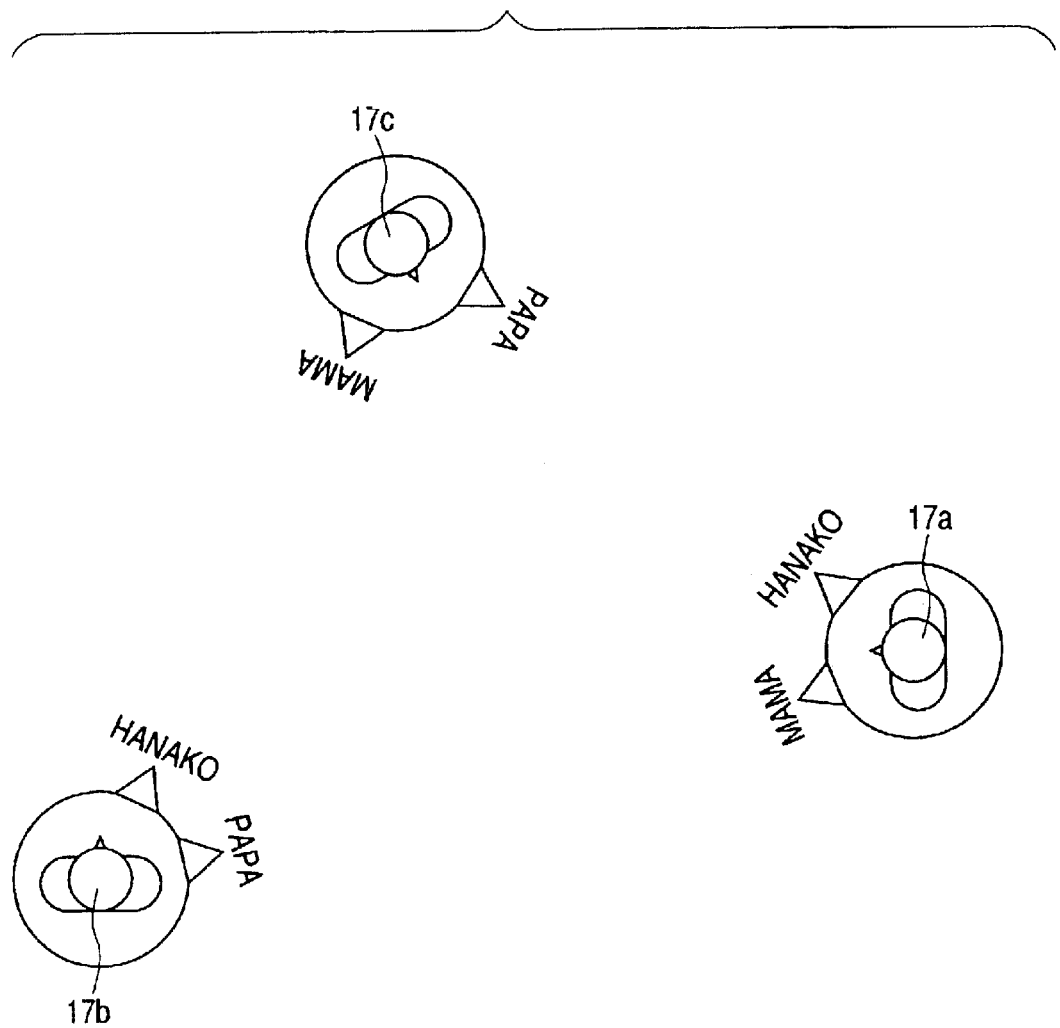
FIG. 7 is a diagram showing a still another specific example of the display state of the guidance screen of the embodiment shown in FIG. 1.
Figure 8:
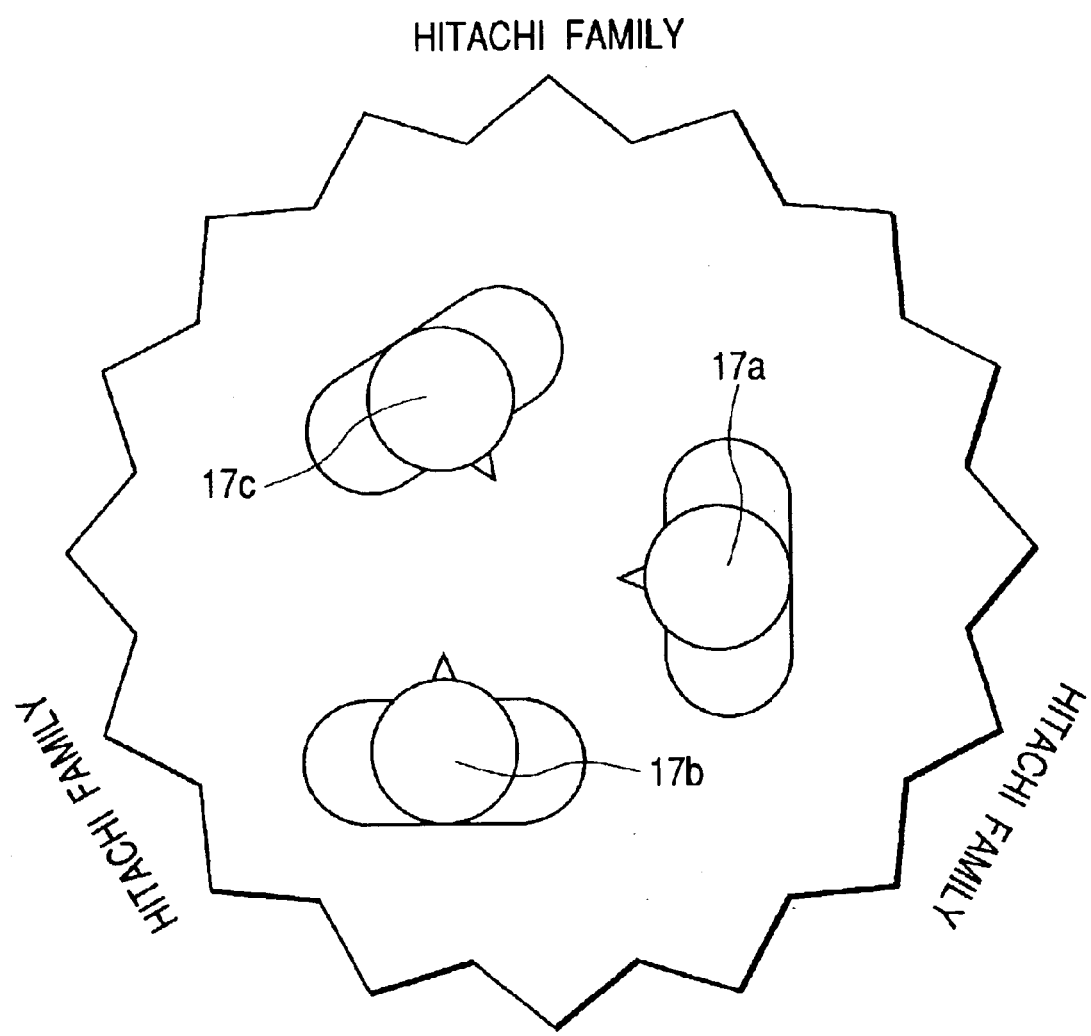
FIG. 8 is a diagram showing a furthermore specific example of the display state of the guidance screen of the embodiment shown in FIG. 1.

FIGS. 7 and 8 are diagrams showing a further another specific example of the display state of the guidance image 4. In this example, a plurality of related identification tags are registered as grouping identification tags. When customers 17a, 17b and 17c carrying the grouping identification tags are standing at positions away from each other, as shown in FIG. 7, guidance displays indicating the directions of the locations of other group members are projected. For example, when the customers 17a, 17b and 17c are a family and a father, mother and daughter, near the father 17a, displayed is a guidance image including display of "mama" indicating the mother and a mark indicating her existence direction and display of "hanako" indicating the daughter and a mark indicating her existence direction. Near the mother 17b and the daughter 17c, as shown in the drawing, displayed is a guidance image including the display of the names of the other group members and their existence direction marks.

When the group members are close to each other and all the group members exist within a range at a fixed distance, as shown in FIG. 8, display 18 surrounding the group members is made. At this time, as "Hitachi Family", it may be switched to display including characters and symbols indicating the name and type of the group.

By providing a plurality of identification tags with group information, in the case of getting lost and waiting in a large facility, it becomes easy to catch the existence directions of the group members or to judge whether group members exist within the facility or not.

In the embodiment, display devices are buried in the floor surface 1a to form a large screen so as to display guidance images movable on the entire floor surface 1a. As shown in FIG. 6, specific areas of the floor surface 1a may be constructed as the display areas 16 of the guidance image 4. In this case, display devices are buried in the floor to cover the entire of each display area. When the customer 6 enters the displayed area 16, the recognition PC of the facility server detects it by the position information from the identification tag 5 and displays the guidance image 4. In this case, locating many display areas 16 at narrow intervals, without finding the display area, the customer 6 can inevitably pass through one of them when he/she moves. This is similar in the case of the projector. An area is decided for each of the projectors so as to project the guidance image. The display position of the guidance image is not always on the floor surface near the tag. It may be at the position such as the floor surface, wall surface and pillar slightly away from the tag so that the tag holder can look at it easily.

In the above embodiment, the air terminal is taken as a facility example. The above embodiment may be also applied in facilities such as large stations, medical institutions, amusement parks and expositions. In this case, the identification tag may be modified in each of the facilities so as to be suitable there. In a station, for example, tag information may be downloaded into a mobile phone possessed by a passenger who buys a ticket and desires to use the mobile phone as the identification tag.

In a large medical institution, a hospital identification card printed with specific ink can be used to detect the position of the card by a camera sensitive to the ink, and to display a guidance image according to the detected position on a floor surface. The identification tag in this case becomes a hospital identification card.

In a large amusement park and exposition, a position detectable transmitter such as a PDA (Personal Digital Assistant) is handed at the entrance of a pavilion to a visitor. With this as an identification tag, guidance images in the pavilion can be displayed to the visitor. In this case, as another application, when the position detectable transmitter is handed, a suitable profile (nationality, blood type, hobby, taste, and so on) may be inputted to display it on a floor surface, so that when persons having the same profile gather in the same place, display indicating these persons is projected. For example, when persons who like the same food gather in the same place, using the food as a title, a circle surrounding the group can be drawn on the floor surface.

In a large library, an address is given to each of bookshelves and books. Accordingly, by handing an identification tag to each customer at a reception, a guidance image indicating the place of each of the bookshelves and the books can be displayed on a floor surface.

In the above embodiment, although the guidance information is always displayed, an ON-OFF switch may be provided on the identification tag, so that guidance service can be offered only when the user desires to see service information. According to this configuration, the user can turned off the switch to stop display the guidance information when the guidance information is unnecessary for the user or the display becomes hard to see due to crowd, thereby to eliminate any trouble due to unnecessary information display. According to the invention, the image is displayed on the floor surface near the customer, so that a customer can see the image easily and understand the contents of the information easily. Further, since the image is a guidance image, it is able to naturally guide the customer to his/her desired place according to the guidance image without requiring the customer much time to find the target place.

As described above, according to the present invention, the image having the contents of service information convenient to the customer can be displayed near the customer without requiring the customer for any operation, so that the customer can obtain the information at any time when necessary.

What is claimed is:

1. A system for displaying guidance information on a floor in a large-scale facility, comprising:

a plurality of tag recognition apparatuses located in the facility, each for sensing tag information stored in a tag device carried by a user, said tag information including a tag identifier and position information of the tag device;

a plurality of image projectors located in the facility, each for selectively projecting a guidance image to a partial area on the floor; and a facility server communicable with said tag recognition apparatuses and said image projectors, for receiving tag information from each of said tag recognition apparatuses, and analyzing received tag information to select one of said image projectors for each tag device;

said facility server comprising:

a recognition unit for removing a data entry from a database in accordance with each tag identifier extracted from the tag information received from each of said tag recognition apparatuses, and for specifying a guidance destination and an advance direction based on the position information extracted from the tag information and a retrieved data entry which includes user information and guidance destination corresponding to the tag identifier;

an image data server for storing various image data therein and for retrieving image data corresponding to the guidance destination and advance direction specified by said recognition unit; and an image creation unit for creating guidance image signals based on the image data obtained from said image data server, and for transmitting the guidance image signals to said selected one of said image projectors, so that said selected one of said image projectors projects a guidance image to a partial area on the floor near the tag device carried by the user according to the guidance image signals.

2. A system for displaying guidance information according to claim 1, wherein:

each of said tag recognition apparatuses transmits the tag information to said facility server periodically with a predetermined time interval;

said facility server selects one of said image projectors nearest to the tag device carried by the user based on said tag information received; and each of said image projectors shifts the partial area to be a projection area of the guidance image in accordance with movement of the tag device.

3. A system for displaying guidance information according to claim 1, wherein:

said data entry retrieved by said recognition unit from the database includes time information designating the time when the user should arrive at the guidance destination.

said recognition unit includes means for analyzing the time information to determine whether there is enough time by the designated time, for notifying a result of the determination to said image data server, and for transmitting position information of the tag device to a service sewer connected via a communication line in the case where there is enough time, said service server storing service information on facilities available to users depending on the position information, and said image data server includes means for receiving, from said service server when there is enough time, service information on facilities near the current position of the tag device carried by the user, and supplying guidance image signals created based an the service information to said image creation unit.

4. A System for displaying guidance information according to claim 3, wherein said selected one of said image projectors projects on the floor a guidance image including service information on facilities near the tag device carried by the user, when there is enough time by the designated time.

5. A system for displaying guidance information according to claim 1, wherein each of a plurality of tag identifiers belonging to a group is registered as a grouping tag in a data entry of said database, so that said image creation unit creates guidance image signals indicating a direction of the other member of the group.

6. A displaying guidance information system, comprising:

one or more image projectors arranged at different locations in a facility, each for selectively projecting a guidance image to a partial area in the facility;

one or more tag recognition apparatuses arranged at different locations in the facility, each for sensing tag information stored in a tag device carried by a user, said tag information including a tag identifier and position information of the tag device; and a facility server arranged to communicate with said tag recognition apparatuses and said image projectors, for receiving tag information from each of said tag recognition apparatuses, and for analyzing received tag information to select one of said image projectors for each tag device, said facility server comprising:

means for retrieving a data entry from a database in accordance with each tag identifier extracted from the tag information received from each of said tag recognition apparatuses, for specifying a guidance destination and an advance direction based on the position information extracted from the tag information and a retrieved data entry which includes user information and guidance destination corresponding to the tag identifier, and for retrieving image data corresponding to the guidance destination and advance direction specified; and means for creating guidance image signals based on the image data and for transmitting the guidance image signals to said selected one of said image projectors, so that said selected one of said image projectors projects a guidance image to a partial area in the facility near the tag device carried by the user according to the guidance image signals.

7. A displaying guidance information system according to claim 6, wherein:

each of said tag recognition apparatuses transmits the tag information to said facility server periodically with a predetermined time interval;

said facility server selects one of said image projectors nearest to the tag device carried by the user based on said tag information received: and each of said image projectors shifts the partial area to be a projection area of the guidance image in accordance with movement of the tag device.

8. A displaying guidance information system according to claim 6, wherein said data entry retrieved from the database includes time information designating the time when the user should arrive at the guidance destination, and wherein facility server further comprises:

means for analyzing the time information to determine whether there is enough time by the designated time, and for transmitting position information of the tag device to a remote service server, via a communication line, when there is enough time, said remote service server storing service information on facilities available to users depending on the position information, and means for receiving, from said remote service sewer, when there is enough time, service information on facilities near the current position of the tag device carried by the user, and supplying guidance image signals created bused on the service information.

9. A displaying guidance information system according to claim 8, wherein said selected one of said image projectors projects a guidance image including service information to the partial area in the facility near the tag device carried by the user, when there is enough time by the designated time.

10. A displaying guidance information system according to claim 6, wherein each of a plurality of tag identifiers belonging to a group is registered as a grouping tag in a data entry of said database, so that said facility server creates guidance image signals indicating a direction of the other member of the group.

* * * * *